Patented Mar. 7, 1950

2,500,127

UNITED STATES PATENT OFFICE 2,500,127

PROCESS FOR PREPARING CYCLAMMONIUM QUATERNARY SALTS CONTAINING AN N-SUBSTITUTED β-AMINOVINYL GROUP

Edward B. Knott, Harrow, England, assignor to Eastman Kodak Company, Rochester, N. Y., a corporation of New Jersey No Drawing. Application January 3, 1946, Serial No. 638,912. In Great Britain January 11, 1945

10 Claims. (Cl. 260—240.8)

This invention relates to a process for preparing cyclammonium quaternary salts containing a N-substituted β-aminovinyl group.

Cyclammonium quaternary salts containing in the α- or γ-position (i. e. one of the so-called reactive positions) a β-anilinovinyl group are usually prepared by condensing a diaryl formamidine with a cyclammonium quaternary salt containing a methyl group in a reactive position. This condensation proceeds best in acetic anhydride, yielding the N-acetylated derivative. See British Patent 344,409, accepted March 4, 1931. Alternatively the aforesaid quaternary salts containing a β-anilinovinyl group can be prepared by condensing, in an alcohol, an alkyl isoformanilide with a cyclammonium quaternary salt containing a methyl group in a reactive position. See my copending application Serial No. 604,521, filed July 11, 1945 (now United States Patent No. 2,487,882, dated November 15, 1949).

I have now found an improved process for preparing cyclammonium quaternary salts containing a N-substituted aminovinyl group by which the cyclammonium quaternary salts can be obtained in high overall yield usually without the necessity of employing a solvent. Moreover, my new process takes place, generally speaking, at lower temperatures than the aforesaid prior processes.

It is, accordingly, an object of my invention to provide an improved process for preparing cyclammonium quaternary salts containing a N-substituted β-aminovinyl group. Other objects will become apparent hereinafter.

In accordance with my invention, I prepare cyclammonium quaternary salts containing a N-substituted β-aminovinyl group in the α- or γ-position (i. e. in one of the so-called reactive positions) by condensing a cyclammonium quaternary salt selected from those represented by the following general formula:

I.

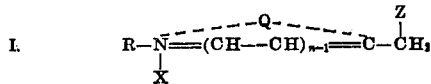

wherein R represents an alkyl group, $n$ represents a positive integer of from 1 to 2, Q represents the non-metallic atoms necessary to complete a heterocyclic nucleus containing from 5 to 6 atoms in the heterocyclic ring, X represents an anion, and Z represents a hydrogen atom, an alkyl group, an aryl group, or a cyano group, with a primary or secondary amine or a N-arylformamide and an ester of orthoformic acid.

The cyclammonium quaternary salts represented by Formula I above, are exemplified by: quaternary salts of the thiazole series containing a methyl group in the 2-position (e. g. quaternary salts of 2-methylthiazole, of 2,4-dimethylthiazole, of 2-methyl-4-phenylthiazole, of 2-methyl-4-(2-thienyl)thiazole, of 2-methylbenzothiazole, of 5-chloro-2-methylbenzothiazole, of 2,5,6-trimethylbenzothiazole, of 2-methyl-α-naphthothiazole, of 2-methyl-β-naphthothiazole, etc.), quaternary salts of the selenazole series containing a methyl group in the 2-position (e. g. quaternary salts of 2-methylselenazole, of 2,4-dimethylselenazole, of 2-methyl-4-phenylselenazole, of 2-methylbenzoselenazole, of 5-chloro-2-methylbenzoselenazole, of 2-methyl-α-naphthoselenazole, of 2-methyl-β-naphthoselenazole, etc.), quaternary salts of the oxazole series containing a methyl group in the 2-position (e. g. quaternary salts of 2-methyl-4-phenyloxazole, of 2-methylbenzoxazole, of 2-methyl-α-naphthoxazole, of 2-methyl-β-naphthoxazole, etc.), quaternary salts of the thiazoline series containing a methyl group in the 2-position (e. g. quaternary salts of 2-methylthiazoline, etc.), quaternary salts of the 3,3-dialkylindolenine series containing a methyl group in the 2-position (e. g. quaternary salts of 2,3,3-trimethylindolenine, etc.), quaternary salts of the pyridine series containing a methyl group in the 2- or 4-position (e. g. quaternary salts of α- or γ-picoline, etc.), quaternary salts of the quinoline series containing a methyl group in the 2- or 4-position (e. g. quaternary salts of quinaldine, of lepidine of 2,6-dimethylquinoline, etc.) Similar quaternary salts, containing in the 2- or 4-position, an ethyl group, a benzyl group, a cyanomethyl group, etc. are also exemplary of the quaternary salts set forth under Formula I above. Any quaternary salt can be employed, e. g. alkohalides (methiodides, ethiodides, n-propobromides), alkalkylsulfates (methomethylsulfates, ethoethylsulfates) alko-p-toluenesulfonates (metho-p-toluenesulfonate, etho-p-toluenesulfonate, etc.).

The esters of orthoformic acid most advantageously employed in practicing my invention are trialkylorthoformates and can be represented by the following general formula:

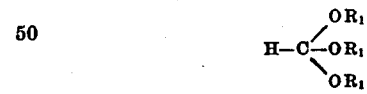

wherein $R_1$ represents an alkyl group, e. g. methyl, ethyl, n-propyl, n-butyl, n-amyl, etc.

Aromatic amines (primary and secondary) are advantageously employed in practicing my invention, e. g. aniline, p-methoxyaniline, m-toluidine, p-toluidine, α-naphthylamine, β-naphthylamine, N-methylaniline, N-ethylaniline, etc. Hydroaromatic amines containing an —NH— group, such as piperidine, 1,2,3,4-tetrahydroquinoline, etc. likewise react readily in accordance with my invention. Heterocyclic amines, such as 2-aminothiazole, 2-aminopyridine, 2-aminoquinoline and 2-aminobenzothiazole, can also be used. Among the N-arylformamides, N-phenylformamide (formanilide) and the N-naphthylformamides are exemplary. The amino compounds which I employ in practicing my invention can be represented by the following general formula:

wherein $R_2$ represents an aryl group or a heterocyclic group, $R_3$ represents a hydrogen atom, an alkyl group or an aralkyl group, or $R_2$ and $R_3$ together represent the non-metallic atoms necessary to form a closed ring. When $R_2$ is aryl, $R_3$ can also represent a formyl

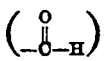

group.

The process of my invention proceeds readily upon heating the amino compound, the ester of orthoformic acid and the cyclammonium quaternary salt. In many cases, it goes smoothly even in the absence of a solvent and on a steam bath. Thus, when ethyl orthoformate, aniline and a quaternary salt of a 2- or 4-methylquinoline, or of a 2-methylthiazole, a 2-methyloxazole or of a 2-methylselenazole, such as of quinaldine or of 2-methylbenzoxazole, or of a 2-methylnaphthoxazole, are heated together in equimolecular proportions on a steam bath, ethyl alcohol is evolved and a color develops. The reaction is complete in most cases in 30 to 45 minutes, the required N-substituted β-anilinovinyl compound solidifying. Quaternary salts with less active methyl groups, such as those of α- or γ-methylpyridines, also react at 100° C. but give better yields in boiling n-amyl alcohol.

The salts of the amines, e. g., acetates or hydrochlorides, give the desired product, but the yields are usually lower.

My new process can be depicted with chemical equations as shown below for the specific condensation of 2-methylbenzothiazole ethiodide, aniline and ethyl orthoformate:

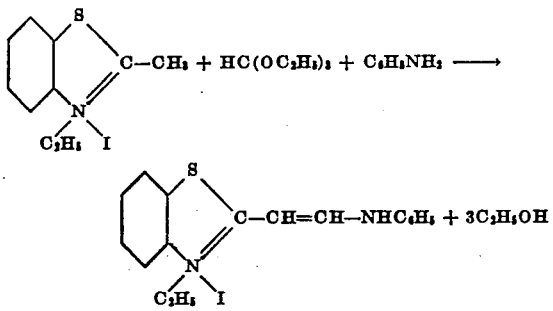

It is known that isoformanilides can be prepared by heating together ethyl orthoformate and an arylamine. Ethyl alcohol is evolved giving the isoformanilide and some diarylformamidine. An isoformanilide or a diarylformamidine can be condensed with a cyclammonium quaternary salt containing a reactive methyl or methylene group to give a β-arylaminovinyl compound or a symmetrical carbocyanine dye. However, it is believed that the process of my invention involving a reaction between an orthoformic ester, an arylamine and a cyclammonium quaternary salt having a reactive methyl group possesses distinct advantages over the processes involving the use of isoformanilides or diarylformamidines as starting materials, viz:

(a) The N-substituted β-aminovinyl compounds are obtained in one stage from an orthoformic ester.

(b) The overall yield is higher.

(c) It is unnecessary, in many cases, to use a solvent.

(d) The low temperature required for my new process makes it possible, in many cases, to use steam for heating.

The following examples will serve to illustrate further the manner of practicing my invention.

*Example 1.*—2-(β-anilinovinyl)-β-naphthothiazole metho-p-toluenesulfonate

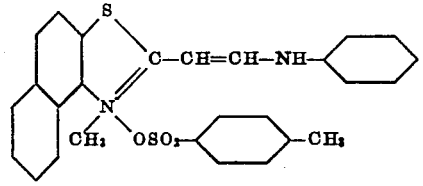

2-methyl-β-naphthothiazole metho-p-toluenesulfonate (3.95 g., 0.01 mol.), ethyl orthoformate (1.48 g., 0.01 mol.) and aniline (0.93 g., 0.01 mol.) were placed in a wide-necked flask and heated on a steam bath for 30 minutes. The solid material dissolved, ethyl alcohol was liberated and the solution turned yellow green. The reaction mixture was allowed to cool and the thick melt was covered with acetone, agitated, and the green crystalline solid collected on a filter and washed with acetone. The washed product was the above-formulated quaternary salt. Yield 68 per cent, melting point indeterminate.

*Example 2.*—2-(β-anilinovinyl)pyridine methiodide

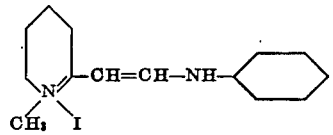

α-Picoline (1.86 g., 0.02 mol.) and methyl-p-toluenesulfonate (3.96 g., 0.02 mol.) were fused on a steam bath. Ethyl orthoformate (3.96 g., 0.02 mol.), aniline (1.86 g., 0.02 mol.) and n-amyl alcohol (5 cc.) were added to the fused mass and the whole was refluxed for 60 minutes. The resulting mixture was poured into an excess of aqueous potassium iodide, whereupon the above-formulated quaternary salt separated out. It was filtered off and recrystallized from water to give yellow needles, melting at 210° C. Yield 65 per cent.

*Example 3.*—2-(β-anilinovinyl)-benzoxazole ethiodide

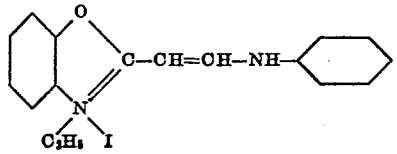

2-methylbenzoxazole ethiodide (2.89 g., 0.01 mol.), aniline (0.93 g., 0.01 mol.) and ethyl orthoformate (1.49 g., 0.01 mol.) were placed in a flask on a steam bath. The solid material dissolved and after 30 minutes the contents of the flask had solidified. The solidified mass was allowed to cool and was then washed with acetone. The washed product which was the above-formulated quaternary salt was dried and obtained as a yellow powder, melting at 220° C. It can be recrystallized from a mixture of methanol and diethyl ether to give yellow needles.

*Example 4.—2-(β-anilinovinyl)benzoxazole metho-p-toluenesulfonate*

2 - methylbenzoxazole metho - p - toluenesulfonate (3.19 g., 0.01 mol.) aniline (0.93 g., 0.01 mol.) and ethyl orthoformate (1.48 g., 0.01 mol.) were fused on a steam bath. The solid material dissolved and then resolidified after 35 minutes. After 45 minutes heating, the solidified material was allowed to cool and was washed with acetone. The washed material which was the 2-(β-anilinovinyl)benzoxazole metho-p-toluenesulfonate was a yellow crystalline solid. Yield 3.3 g. (78%). From a mixture of methanol and diethyl ether, the yellow quaternary salt crystallized as yellow aggregates, melting at 214° C.

*Example 5.—2-(β-anilinovinyl)benzoxazole metho-p-toluenesulfonate*

This substance was prepared exactly as in Example 4 above, except that the reactants were fused at 120° C. instead of on the steam bath. Yield 51 per cent.

*Example 6.—2-(β-anilinovinyl)benzoxazole etho-p-toluenesulfonate*

This quaternary salt was prepared exactly as in Example 4, but using 2-methylbenzoxazole etho-p-toluenesulfonate (3.33 g.) instead of the metho-p-toluenesulfonate. The melt solidified after 45 minutes. The yield of yellow crystals of quaternary salt after washing with acetone was 3.5 g. (81% yield). From a mixture of methanol and diethyl ether, the quaternary salt crystallized in the form of yellow aggregates, melting at 218° C.

*Example 7.—2-[β-(p-toluidino)vinyl] - benzoxazole metho-p-toluenesulfonate*

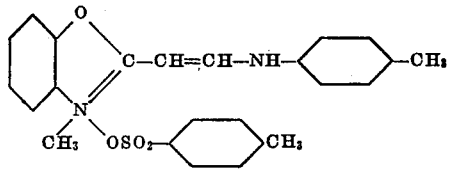

2-methylbenzoxazole metho - p - toluenesulfonate (3.19 g., 0.01 mol.), p-toluidine (1.03 g., 0.01 mol.) and ethyl orthoformate (1.48 g., 0.01 mol.) were fused at 120° C. for 30 minutes. The resulting solid above-formulated quaternary salt was allowed to cool and washed with acetone and recrystallized from a mixture of methanol and diethyl ether. It was obtained as yellow needles melting at 204° C. Yield 3.2 g.

*Example 8.—2-(β-methylanilinovinyl)pyridine methiodide*

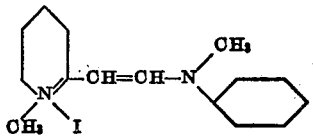

Proceeding exactly as in Example 2, but using methylaniline (2.14 g.) instead of aniline, the above-formulated quaternary salt was obtained, after recrystallization from hot water, as golden needles, melting at 249° C.

*Example 9.—2-[β-(1-piperidyl)vinyl]-pyridine methoperchlorate*

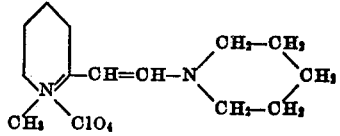

α-Picoline metho-p-toluenesulfonate (5.78 g., 0.02 mol.), ethyl orthoformate (2.96 g., 0.02 mol.) and piperidine (1.7 g., 0.02 mol.) were fused at 160° C. for 60 minutes. The resulting deep red melt was dissolved in water and poured into aqueous sodium perchlorate. Red needles of the above quaternary salt separated. The quaternary salt was recrystallized from ethyl alcohol and obtained as dark red needles, melting at 160° C.

*Example 10.—2-(β-anilinovinyl)benzoxazole etho-p-toluenesulfonate*

2-methylbenzoxazole etho-p-toluenesulfonate (3.33 g.), ethyl orthoformate (1.48 g.), formanilide (1.21 g.) and ethyl alcohol (3 cc.) were heated on the steam bath for 45 minutes. On trituration of the resulting cooled mass with acetone, the β-anilinovinyl compound separated in 30 per cent yield. Melting point 218° C.

*Example 11.—2-[β-(2-pyridylamino)vinyl]-pyridine ethiodide*

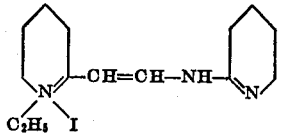

α-Picoline (1.86 g.) and ethyl-p-toluenesulfonate (4 g.) were fused on a steam bath for 15 minutes. Ethyl orthoformate (2.96 g.) and 2-aminopyridine (1.88 g.) as well as n-amyl alcohol (10 cc.) were added to the fused mixture and the whole was refluxed for 2 hours. The resulting red solution was poured in a saturated aqueous solution of potassium iodide, the resulting mixture chilled and 20 cc. of diethyl ether was added. The above-formulated ethiodide crystallized out. It was filtered off and recrystallized from hot water, yielding yellow needles melting at 83° C. Upon drying over potassium hydroxide, it melted at 171° C.

*Example 12.—2-[β-(2-thiazolylamino)vinyl]-pyridine ethiodide*

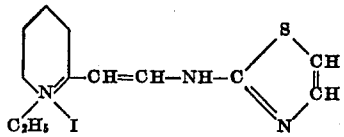

Proceeding as in Example 11, but using 2-aminothiazole (4 g.) instead of 2-aminopyridine, the above-formulated ethiodide was obtained, upon recrystallization from ethyl alcohol, as yellow needles, melting at 188° C.

*Example 13.—2-[β-(4-pyridylamino)vinyl]-pyridine methiodide*

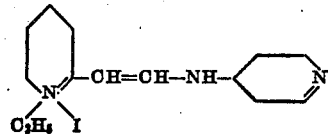

Proceeding as in Example 11, but using 4-aminopyridine (1.88 g.) instead of 2-aminopyridine, the above-formulated methiodide was obtained, upon recrystallization from water, as purple needles, melting at 220° C.

*Example 14. — 2 - [β - (2 - pyridylamino)vinyl]-benzoxazole metho-p-toluenesulfonate*

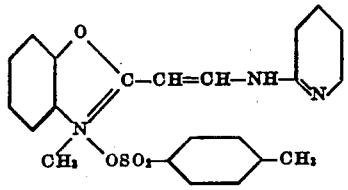

2-methylbenzoxazole metho-p-toluenesulfonate (3.19 g.), ethyl orthoformate (1.48 g.) and 2-aminopyridine (0.94 g.) were fused on a water bath for 1 hour. Acetone was added to fusion mixture and the whole was chilled. The resulting orange crystalline cake was washed with acetone and recrystallized from ethyl alcohol whereupon the above-formulated metho-p-toluenesulfonate was obtained as orange-red crystals, melting at 228° C.

*Example 15. — 2 - [β-(2-thiazolylamino)vinyl]-benzoxazole metho-p-toluenesulfonate*

2-methylbenzoxazole metho-p-toluenesulfonate (3.19 g.), ethyl orthoformate (1.48 g.) and 2-aminothiazole (1 g.) were dissolved in ethyl alcohol (5 cc.) and the mixture was refluxed for 30 minutes. The alcohol was then removed from the mixture and acetone (10 cc.) was added. The crystals which formed were collected and washed with acetone. Those crystals of the thiazolylaminovinyl compound were recrystallized from a mixture of ethyl alcohol and diethyl ether and obtained as glinting yellow needles, melting at 207° C.

*Example 16.—2-[β-(1-morpholyl)vinyl]-pyridine methoperchlorate*

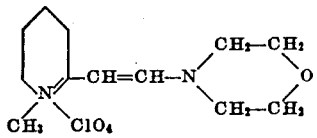

α-Picoline (1.86 g.) and methyl-p-toluenesulfonate (3.92 g.) were fused at 100° C. for 15 minutes. To the melt was added ethyl orthoformate (2.96 g.), morpholine (1.72 g.) and n-amyl alcohol (5 cc.) After refluxing for 2 hours, the red solution was treated with an excess of sodium perchlorate. The reddish crystals of the above-formulated compound had a melting point of 176° C. after recrystallization from methyl alcohol.

*Example 17.—2-[β-(8-quinolylamino)vinyl]-pyridine methiodide*

Proceeding as in Example 16, but replacing the morpholine with 8-aminoquinoline (2.9 g.) and precipitating the pyridine quaternary salt as the iodide, the above-named pyridine quaternary salt was obtained as deep orange flat needles melting at 254° C.

*Example 18.—2-[β-(p-anisidino)vinyl]-quinoline etho-p-toluenesulfonate*

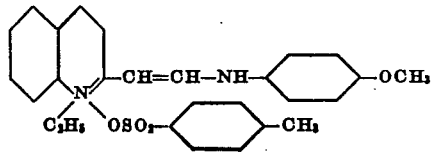

Quinaldine etho-p-toluenesulfonate (6.86 g.), ethyl orthoformate (1.96 g.), p-anisidine (2.46 g.) and ethyl alcohol (5 cc.) were heated on the steam bath for 30 minutes, allowing the alcohol to evaporate. Acetone (5 cc.) was added and the mixture chilled. The yellow crystals were collected after several hours, washed with acetone and recrystallized from ethyl alcohol. Golden brown needles of the above-formulated quinoline quaternary salt melting at 264° C. were thus obtained.

*Example 19. — 2 - [β-(2-naphthylamino)vinyl]-quinoline etho-p-toluenesulfonate*

Prepared as in Example 18, but using β-naphthylamine (2.86 g.), the above-named quinoline quaternary salt was obtained as flat, bronze needles, melting at 236° C. after recrystallization from ethyl alcohol.

*Example 20. — 2-[β-(p-anisidino)vinyl]-benzoxazole etho-p-toluenesulfonate*

2-methylbenzoxazole etho-p-toluenesulfonate (3.19 g.), ethyl orthoformate (1.48 g.) and p-anisidine (1.23 g.) were heated for 60 minutes on a steam bath. The resulting yellow solid upon recrystallization from a mixture of ethyl alcohol and diethyl ether formed canary yellow needles, melting at 206° C.

*Example 21. — 2-[β-(p-anisidino)vinyl]-benzothiazole etho-p-toluenesulfonate*

2-methylbenzothiazole etho-p-toluenesulfonate (3.49 g.), ethyl orthoformate (1.48 g.), p-anisidine (1.23 g.) and ethyl alcohol (2 cc.) were refluxed together for 30 minutes. Acetone (10 cc.) was added and the red solution put aside for 2 hours. A small amount of carbocyanine dye separated. This was filtered off and the filtrate chilled overnight. The orange solid which separated formed silky, deep yellow needles, melting point 204° C. from ethyl alcohol.

*Example 22. — 2 - [β-(2-naphthylamino)vinyl]-benzothiazole etho-p-toluenesulfonate*

Proceeding as in Example 21, but replacing the anisidine with β-naphthylamine (1.43 g.), the above-named toluenesulfonate was obtained as orange needles, melting at 227° C. after recrystallization from ethyl alcohol.

*Example 24.—2-anilinovinylthiazoline ethiodide*

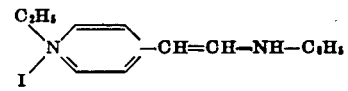

γ-Picoline (1.86 g.) and ethyl-p-toluenesulfonate (4 g.) were fused at 100° C. for 15 minutes. Ethyl orthoformate (3 g.), aniline (1.86 g.) and n-amyl alcohol (5 cc.) were added to mixture and the whole was refluxed for 2 hours. An excess of aqueous potassium iodide was added and the above-formulated ethiodide precipitated by adding diethyl ether. Recrystallized from water, it formed yellow needles of the trihydrate melting at 65° C. Yield 69 per cent.

*Example 24.—2-anilinovinylthiazoline ethiodide*

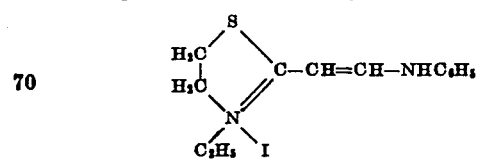

2-methylthiazoline etho-p-toluenesulfonate (6 g.), ethyl orthoformate (3 g.) and aniline (1.86 g.) were fused at 140° C. for 60 minutes. A slight excess of aqueous potassium iodide was added and the ethiodides precipitated with acetone. The solid which precipitated was dissolved in boiling alcohol and the solution allowed to cool. Unchanged 2-methylthiazoline ethiodide crystallized out rapidly. This was filtered off and the filtrate chilled whereupon 2.1 g. of 2-β-anilinovinylthiazoline ethiodide separated. Recrystallized from ethyl alcohol, it formed flat, yellow needles, melting at 212° C.

In a manner like that illustrated in the foregoing examples, other primary and secondary amines can be employed in producing N-substituted β-aminovinyl compounds.

The N-substituted β-aminovinyl compounds obtained by employing heterocyclic amines of the character of 2-aminopyridine, 4-aminopyridine, 2-aminothiazole, etc., i. e. heterocyclic amines of the following general formula:

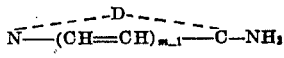

wherein D represents the non-metallic atoms necessary to complete a heterocyclic nucleus containing from 5 to 6 atoms in the heterocyclic ring (e. g. a pyridine nucleus, a quinoline nucleus, a thiazole nucleus, a benzothiazole nucleus, a naphthothiazole nucleus, an oxazole nucleus, a benzoxazole nucleus, a naphthoxazole nucleus, a selenazole nucleus, a benzoselenazole nucleus, a naphthoselenazole nucleus, etc.) and $m$ represents a positive integer of from 1 to 2, can be converted to azacyanine bases by treatment with sodium hydroxide in acetone in a manner similar to that disclosed in United States Patent 2,298,732, dated October 13, 1942. The resulting azacyanine bases can be represented by the following general formula:

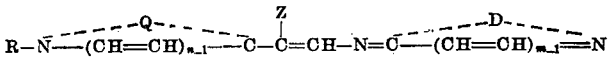

wherein R, Q, $n$, Z, D and $m$ have the values recited above.

What I claim as my invention and desire to be secured by Letters Patent of the United States is:

1. A process for preparing a cyclammonium quaternary salt containing a N-substituted β-aminovinyl group comprising condensing one molecular proportion of a cyclammonium quaternary salt selected from those represented by the following general formula:

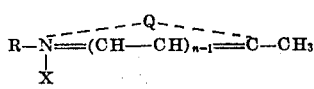

wherein R represents an alkyl group, X represents an anion, $n$ represents a positive integer of from 1 to 2, Q represents the non-metallic atoms necessary to complete a heterocyclic nucleus containing from 5 to 6 atoms in the heterocyclic ring, with one molecular proportion of an ester of orthoformic acid and one molecular proportion of an amino compound selected from the group consisting of primary aromatic monoamines, hydroaromatic monoamines containing an intracyclic —NH— group and N-arylformamides.

2. A process for preparing a cyclammonium quarternary salt containing a N-substituted β-aminovinyl group comprising heating one molecular proportion of a cyclammonium quaternary salt selected from those represented by the following general formula:

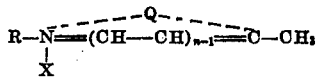

wherein R represents an alkyl group, X represents an anion, $n$ represents a positive integer of from 1 to 2, Q represents the non-metallic atoms necessary to complete a heterocyclic nucleus containing from 5 to 6 atoms in the heterocyclic ring, with one molecular proportion of an ester of orthoformic acid and one molecular proportion of an amino compound selected from the group consisting of primary aromatic monoamines, hydroaromatic monoamines containing an intracyclic —NH— group and N-arylformamides.

3. A process for preparing a cyclammonium quaternary salt containing a N-substituted β-aminovinyl group comprising heating one molecular proportion of a cyclammonium quaternary salt selected from those represented by the following general formula:

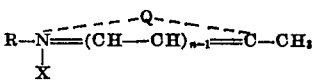

wherein R represents an alkyl group, X represents an anion, $n$ represents a positive integer of from 1 to 2, Q represents the non-metallic atoms necessary to complete a heterocyclic nucleus containing from 5 to 6 atoms in the heterocyclic ring, with one molecular proportion of a trialkyl orthoformate containing from 4 to 16 carbon atoms and one molecular proportion of a primary aromatic amine.

4. A process for preparing a cyclammonium quaternary salt containing a N-substituted β-aminovinyl group comprising heating one molecular proportion of a cyclammonium quaternary salt selected from those represented by the following general formula:

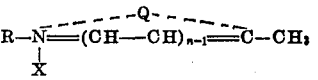

wherein R represents an alkyl group, X represents an anion, $n$ represents a positive integer of from 1 to 2, Q represents the non-metallic atoms necessary to complete a heterocyclic nucleus containing from 5 to 6 atoms in the heterocyclic ring, with one molecular proportion of a trialkyl orthoformate containing from 4 to 16 carbon atoms and one molecular proportion of a primary aromatic monoamine of the benzene series.

5. A process for preparing a cyclammonium quaternary salt containing a N-substituted β-aminovinyl group comprising heating one molecular proportion of a cyclammonium quaternary salt selected from those represented by the following general formula:

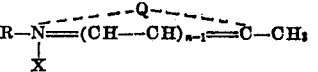

wherein R represents an alkyl group, X represents an anion, $n$ represents a positive integer of from 1 to 2, Q represents the non-metallic atoms necessary to complete a heterocyclic nucleus containing from 5 to 6 atoms in the heterocyclic ring, with one molecular proportion of a trialkyl orthoformate containing from 4 to 16 carbon atoms and one molecular proportion of a N-arylformamide.

6. A process for preparing a cyclammonium quaternary salt containing a N-substituted β-aminovinyl group comprising heating one molecular proportion of a cyclammonium quaternary salt selected from those represented by the following general formula:

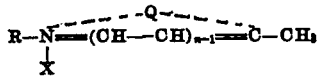

wherein R represents an alkyl group, X represents an anion, n represents a positive integer of from 1 to 2, Q represents the non-metallic atoms necessary to complete a heterocyclic nucleus containing from 5 to 6 atoms in the heterocyclic ring, with one molecular proportion of a trialkyl orthoformate containing from 4 to 16 carbon atoms and one molecular proportion of a N-arylformamide wherein the aryl group is of the benzene series.

7. A process for preparing a cyclammonium quaternary salt containing a N-substituted β-aminovinyl group comprising heating one molecular proportion of a cyclammonium quaternary salt selected from those represented by the following general formula:

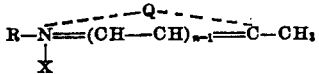

wherein R represents an alkyl group, X represents an anion, n represents a positive integer of from 1 to 2, Q represents the non-metallic atoms necessary to complete a heterocyclic nucleus containing from 5 to 6 atoms in the heterocyclic ring, with one molecular proportion of a trialkyl orthoformate containing from 4 to 16 carbon atoms and one molecular proportion of a hydroaromatic monoamine containing an intracyclic —NH— group.

8. A process for preparing a cyclammonium quaternary salt containing a N-substituted β-aminovinyl group comprising heating one molecular proportion of a cyclammonium quaternary salt selected from those represented by the following general formula:

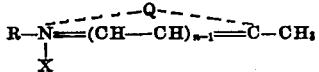

wherein R represents an alkyl group, X represents an anion, n represents a positive integer of from 1 to 2, Q represents the non-metallic atoms necessary to complete a heterocyclic nucleus containing from 5 to 6 atoms in the heterocyclic ring, with one molecular proportion of a trialkyl orthoformate containing from 4 to 16 carbon atoms and one molecular proportion of aniline.

9. A process for preparing a cyclammonium quaternary salt containing a N-substituted β-aminovinyl group comprising heating one molecular proportion of a cyclammonium quaternary salt selected from those represented by the following general formula:

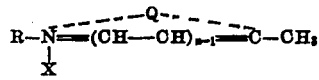

wherein R represents an alkyl group, X represents an anion, n represents a positive integer of from 1 to 2, Q represents the non-metallic atoms necessary to complete a heterocyclic nucleus containing from 5 to 6 atoms in the heterocyclic ring, with one molecular proportion of a trialkyl orthoformate containing from 4 to 16 carbon atoms and one molecular proportion of formanilide.

10. A process for preparing a cyclammonium quaternary salt containing a N-substituted β-aminovinyl group comprising heating one molecular proportion of a cyclammonium quaternary salt selected from those represented by the following general formula:

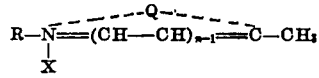

wherein R represents an alkyl group, X represents an anion, n represents a positive integer of from 1 to 2, Q represents the non-metallic atoms necessary to complete a heterocyclic nucleus containing from 5 to 6 atoms in the heterocyclic ring, with one molecular proportion of a trialkyl orthoformate containing from 4 to 16 carbon atoms and one molecular proportion of piperidine.

EDWARD B. KNOTT.

REFERENCES CITED

The following references are of record in the file of this patent:

UNITED STATES PATENTS

| Number | Name | Date |
| --- | --- | --- |
| 2,189,599 | Brooker | Feb. 6, 1940 |
| 2,201,816 | Middleton | May 21, 1940 |
| 2,202,991 | Middleton | June 4, 1940 |
| 2,265,908 | Kendall | Dec. 9, 1941 |
| 2,274,782 | Gasper | Mar. 3, 1942 |

FOREIGN PATENTS

| Number | Country | Date |
| --- | --- | --- |
| 344,409 | Great Britain | 1930 |

OTHER REFERENCES

Beilstein, vol. 12, 4th edition, page 236.